United States Patent [19]

Liukko

[11] Patent Number: 4,604,152
[45] Date of Patent: Aug. 5, 1986

[54] METHOD OF MAKING A STITCHED AND BONDED SEAM

[76] Inventor: Lasse Liukko, Mariankatu 16 B 18, SF-15110 Lahti, Finland

[21] Appl. No.: 649,840

[22] Filed: Sep. 11, 1984

[30] Foreign Application Priority Data

Sep. 12, 1983 [FI] Finland ................................. 833260

[51] Int. Cl.$^4$ .......................... B32B 31/12; B32B 7/08
[52] U.S. Cl. ......................................... 156/93; 2/275; 428/104
[58] Field of Search ............... 156/93; 428/104; 2/275

[56] References Cited

U.S. PATENT DOCUMENTS

| | | | |
|---|---|---|---|
| 2,465,374 | 3/1949 | Haman et al. | 428/104 |
| 4,236,952 | 12/1980 | Krause et al. | 156/93 |
| 4,368,086 | 1/1983 | Villemain | 156/93 |
| 4,508,582 | 4/1985 | Fink | 156/93 |
| 4,549,916 | 10/1985 | Off et al. | 156/93 |
| 4,561,128 | 12/1985 | Zimmerman | 2/275 |

FOREIGN PATENT DOCUMENTS

| | | |
|---|---|---|
| 1803469 | 5/1970 | Fed. Rep. of Germany . |
| 2104441 | 3/1983 | United Kingdom . |

*Primary Examiner*—Robert A. Dawson
*Attorney, Agent, or Firm*—Andrus, Sceales, Starke & Sawall

[57] ABSTRACT

A method of making a seam in laminated textile fabric. The edges of a pair of sheets of fabric are separately stitched with reinforcing stitching and the stitched edges are then positioned in lapping relation. A layer of a thermoadhesive is interposed between the lapping edges and on the application of heat and pressure to the lapping edges the thermoadhesive layer will melt and permeate the fabric, as well as the stitching, to provide a tight and waterproof seam.

4 Claims, 1 Drawing Figure

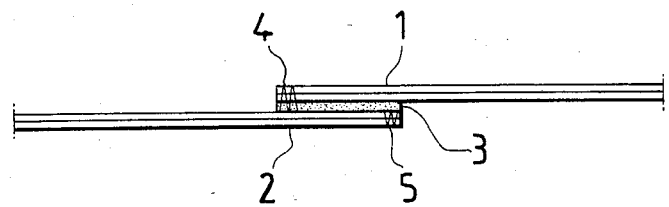

METHOD OF MAKING A STITCHED AND BONDED SEAM

BACKGROUND OF THE INVENTION

The subject of the invention is a method of making a seam in laminated textile fabric.

Laminated textiles are used for clothes manufactured for special purposes and in other outfittings. These outfittings or clothes must be versatile in character and suited to their operational purpose. The laminated textile fabrics in current use can, for example, be made wind or waterproof and as the result of their other characteristics suitable for very demanding uses. In making clothing and other outfittings an adverse factor is, however, the making of the seam, which should possess characteristics corresponding to the rest of the fabric.

Making a waterproofed seam in such a manner that it is also flexible and does not restrict the use of clothing has proved to be particularly difficult. At present the seam is manufactured by setting the edges of the material one upon another and fastening the edges by sewing. A covering tape is set between the fabrics to cover the seam. The covering tape is made of such a material that it can be attached to the textile material by pressure against the fabric and by leading hot air to the pressure area. In making this type of seam the dimensioning must be accurate and the covering tape precisely aligned with the seam. The covering tape cannot however be wide because it would hamper the use of the fabric and clothing. The edge of the fabric which is uppermost has only been joined to the lower fabric with the aid of sewing so that when the sewing comes undone the seam easily breaks open. Water easily penetrates between the sewings, which for example, upon freezing, can damage the sewing and lead to the risk of the seam breaking open or at least lessening the effect of the waterproofing.

The purpose of the invention is to bring into use a method of making a seam in laminated textile fabrics which eliminates the adverse features of the earlier methods. In particular the purpose is to bring into use a method for making a seam which is strong and waterproofed and which is more durable than seams made by current methods.

SUMMARY OF THE INVENTION

The intentions of the invention have been achieved by the method which is mainly characterized in the patent claims put forward.

In accordance with the invention the edges of laminated textile materials to be joined to one another are stitched by reinforcing stitches in order to ensure the permanence of fastening of the joint, one edge being given a thermoadhesive layer, the edges being set one upon another so that the above thermoadhesive layer comes between the material edges. The edges are pressed together and the adhesive layer is simultaneously heated whereupon the adhesive layer melts, the melted adhesive permeating the weave at the edges of the fabric and gluing their threads imperviously together. The adhesive also penetrates the sewing holes in the fabric and in this way tightly joins the edges together. When the adhesive layer is located within the area of the edges of textile materials a particularly tidy and waterproof seam is achieved. There are few discontinuous points, as are to be found in seams made with the current method and the seam does not differ disconcertingly in thickness from the rest of the material.

In accordance with the invention the thermoadhesive layer is heated to advantage with high frequency equipment to the melting temperature. In using high frequency methods only the adhesive layer is heated under the influence of radiation and glues the fabric materials which are pressed together. The textile material is not subjected to very high temperatures and the heat does not adversely affect the surfaces of the material, as in earlier recognised methods.

The thermoadhesive is applied with advantage in the form of adhesive tape to one end of the fabric before setting the edges of the material one upon another. The adhesive tape is first carefully set on edge of the fabric and thereafter this edge can be set to accurate measurements onto the other edge. The thermoadhesive layer thus comes exactly to the desired location and joins the two materials together as efficiently as possible. The thermoadhesive tape is advantageously fastened to the outer edge of the upper fabric by reinforcing stitches before the seaming together of the fabric edges.

In the method according to the invention various recognised thermoadhesive tapes intended for this purpose or corresponding products can be used. Depending on the characteristics of the fabric material, the seam and the thermoadhesive, in accordance with the invention, a thermoadhesive tape of several layers can be used to form the thermoadhesive layer.

The stitching of the edges of the laminated fabric before gluing eliminates the fraying of the edges which occurs with current methods. As the adhesive permeates the stitches it also strengthens the edges of the fabric. It is not advantageous to make the stitching very close together because the stitches can prevent penetration of the adhesive between the fabric materials. For this reason the stitch spacing is suitable when more than 3 mm and can with advantage be more than 5 mm, for example at 5–10 mm.

BRIEF DESCRIPTION OF THE DRAWING

In the following the invention is explained more closely by referring to the accompanying drawing which illustrates a seam made in accordance with the method of the invention in cross section and viewed from one side.

DETAILED DESCRIPTION OF THE INVENTION

The edges of the laminated textile fabric 1, 2 are reinforced by the stitching 4, 5. The edge of the fabric 2 is set onto the uppermost edge of fabric 1 and joined with the aid of the glue layer 3 to the fabric 1. The seam created is tight and strong.

In making the seam the edges of the fabric 1, 2 are stitched and the edge 1 is furnished with a thermoadhesive layer 3 after which the edges are set together one upon another so that the thermoadhesive layer comes between them. The edges are pressed one above the other, heating the thermoadhesive layer by high frequency equipment so that the adhesive layer melts and permeates into the weave of the edges and fastens edges 1, 2 together. The adhesive fills the weave of the seam and the seam is also strongly glued between the stitches. In the application shown the thermoadhesive tape 3 is stitched to the under surface of the upper fabric 1, i.e. to the outer edge of said fabric with a reinforcing stitching.

The method in accordance with the invention can also be applied to other corresponding purposes, for example a pocket of similar feature can be attached to clothing or onto the surface of an outfit by methods according to the invention when a waterproofed pocket is achieved. Other applications are also possible when keeping within the framework of the patent claim.

What I claim is:

1. A method of making a seam in laminated textile fabric, comprising the steps of separately stitching along the edges of a pair of sheets of fabric with reinforcing stitching, positioning the edge portions of the sheets in lapping relation and offsetting the stitched edges from each other, interposing a layer of thermoadhesive material between the lapping edges, maintaining the lapping edges free of interconnected stitching, and heating the thermoadhesive material to melt said thermoadhesive material and penetrate the molten thermoadhesive material into the fabric and into the stitching to provide a tight and waterproof seam.

2. The method of claim 1, wherein the thermoadhesive material is applied as a thermoadhesive tape to the edge of one of said fabric sheets.

3. The method of claim 2 wherein the thermoadhesive tape is fastened to the edge of said one sheet by said reinforcing stitches before positioning the sheets in lapping relation.

4. The method of claim 1, wherein the width of said thermoadhesive layer is less than the width of said overlapping edges so that said layer is unexposed in the completed seam.

* * * * *